Jan. 26, 1960
L. L. CALLAHAN ET AL
2,922,472
EXTENSIBLE AUTOMOBILE AWNING AND
CANTILEVER SUPPORT THEREFOR
Filed June 17, 1957
3 Sheets-Sheet 1
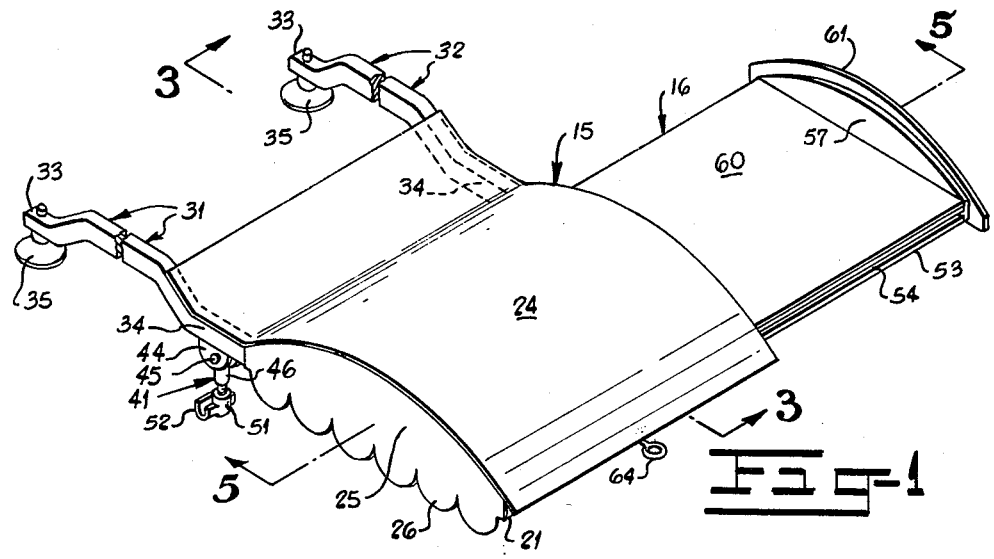
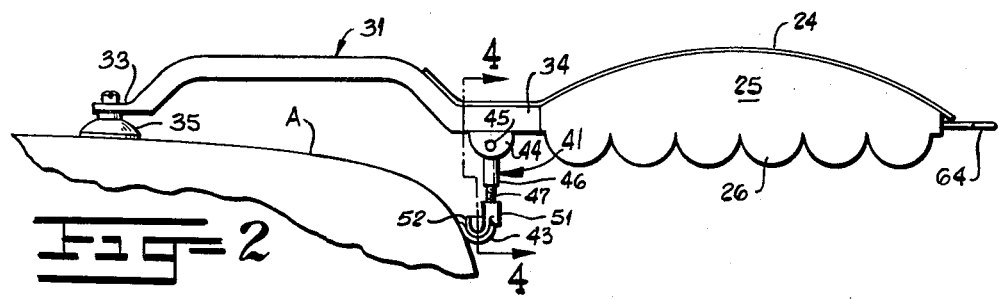
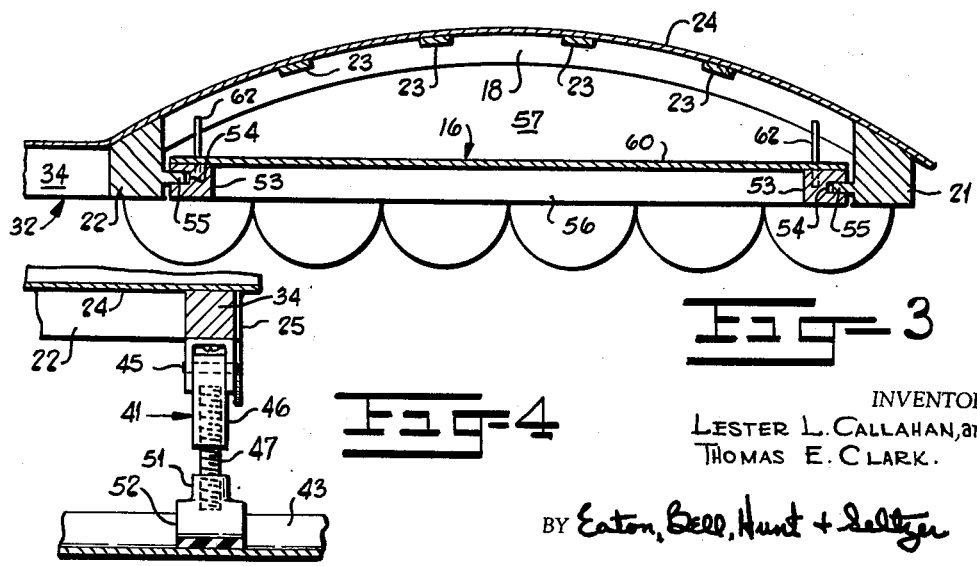
INVENTORS
LESTER L. CALLAHAN, and
THOMAS E. CLARK.
BY Eaton, Bell, Hunt + Seltzer
ATTORNEYS

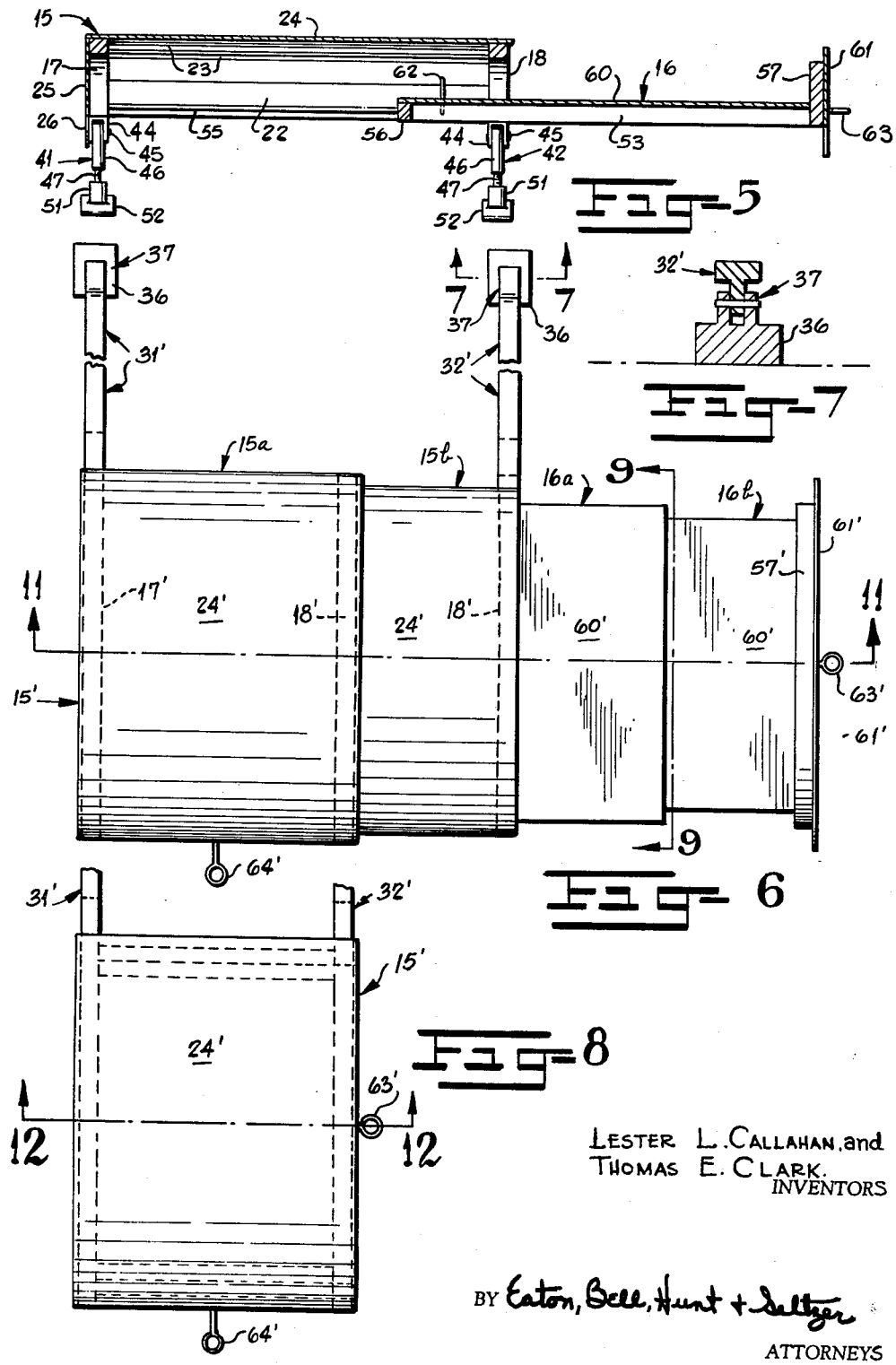

Jan. 26, 1960  L. L. CALLAHAN ET AL  2,922,472
EXTENSIBLE AUTOMOBILE AWNING AND
CANTILEVER SUPPORT THEREFOR.

Filed June 17, 1957  3 Sheets-Sheet 3

INVENTORS:
LESTER L. CALLAHAN, and
THOMAS E. CLARK.

BY Eaton, Bell, Hunt + Seltzer
ATTORNEYS

United States Patent Office 2,922,472
Patented Jan. 26, 1960

2,922,472

EXTENSIBLE AUTOMOBILE AWNING AND CANTILEVER SUPPORT THEREFOR

Lester L. Callahan and Thomas E. Clark, Morganton, N.C.

Application June 17, 1957, Serial No. 666,162

11 Claims. (Cl. 160—62)

This invention relates to awnings for automobiles and more particularly to awnings which may be readily installed over the doors of parked automobiles without extraneous fastening means and instantly removed when desired.

Drive-in restaurants which provide the service of food directly to the occupants of an automobile without requiring them to leave the automobile are becoming increasingly popular. In order to provide temporary storage for the food and dishes while the occupants of the automobile are eating it has become conventional practice to temporarily connect a tray to the door of an automobile which extends laterally from the door. In most instances it is necessary to lower the window of the car in order to install the tray on the door. Since the tray projects outwardly from the car it is obvious that this arrangement is unsatisfactory in inclement weather since the tray is not only exposed to the weather but the opened window exposes the occupants of the car to the elements.

In order to overcome this disadvantage it is a primary object of this invention to provide an awning which may be readily and releasably attached to the roof of the car and extend laterally beyond the edge of the car a suitable distance to shelter the tray and the occupants of the car from sun and rain alike.

It is another object of this invention to provide an awning of the type described which is extensible whereby it will occupy a minimum of space when stored and yet be able to afford maximum protection when installed on an automobile for use. For example, the extensible awning of this invention may be extended to cover both the front and rear windows on one side of the car. If desired, a similar installation may be made on the other side of the car to protect the contents of serving trays and the occupants within the car.

Another object of the invention is to provide an awning of the type described which is of lightweight construction thereby lending itself to easy installation and which may be carried by the waiter or car hop to and from the car together with the serving tray thereby providing a useful accessory for drive-in restaurants and the like. Since the awning of this invention may be collapsed into a small lightweight package for storage it also lends itself to storage within the trunk of an automobile if so desired.

Another object of the invention is to provide an awning and supporting means therefor which may be readily and removably attached to the roof of a car to support the awning in cantilever fashion over one side of the car in such manner as not to interfere with the opening and closing of the doors beneath the awning. Such an arrangement has the obvious advantage of permitting free ingress and egress through the doors of the car while the awning is installed. Although one specific utility of the invention is as an accessory for drive-in restaurants, the awning is useful to provide shade and shelter whenever and wherever the car is parked.

Some of the objects of the invention having been stated, other objects will appear as the description proceeds when taken in connection with the accompanying drawings, in which—

Figure 1 is a perspective view of one form of the invention in extended position;

Figure 2 is an end elevation looking at the left-hand side of the form of invention shown in Figure 1 and showing the awning mounted on an automobile;

Figure 3 is an enlarged transverse vertical sectional view taken along the line 3—3 in Figure 1;

Figure 4 is an enlarged vertical sectional view taken along the line 4—4 in Figure 2 and showing the manner in which one of the adjustable legs is positioned in the rain gutter of the automobile to support the awning;

Figure 5 is a longitudinal sectional view of the extended awning taken along the line 5—5 in Figure 1;

Figure 6 is a top plan view of a modified form of the invention wherein the awning is provided with three extensible sections and showing the awning in extended position as it would appear when installed on an automobile, some hidden parts of the awning being shown in dotted lines;

Figure 7 is an enlarged vertical sectional view taken along the line 7—7 in Figure 6 illustrating an alternate manner in which magnets or suction cups may be connected to the arms of the awning for releasably connecting it to the roof of an automobile;

Figure 8 is a view similar to Figure 6 but showing the modified awning in collapsed position;

Figure 9:
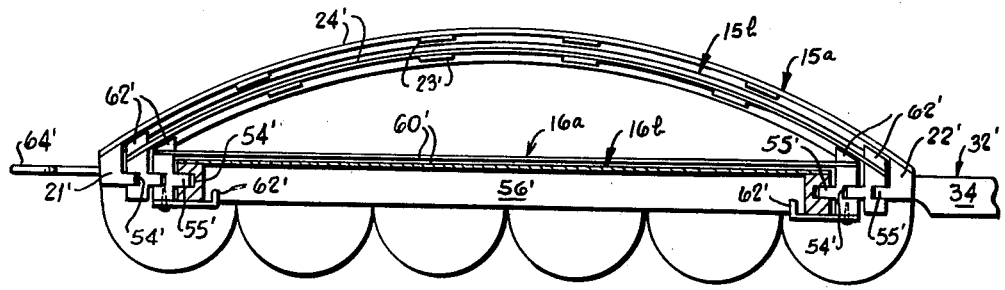
Figure 9 is a transverse vertical sectional view taken along the line 9—9 in Figure 6.

Referring more specifically to the drawings, one form of the invention shown in Figures 1 through 5, inclusive, comprises a canopy broadly indicated at 15 within which may be telescopically mounted a slidable portion or extensible awning member 16.

The canopy 15 comprises a pair of arched transverse frame members 17 and 18 adjacent its opposite ends and front and rear longitudinal frame members 21 and 22 extending between the transverse frame members 17 and 18. A plurality of ribs 23 also extend between the transverse frame members 17 and 18 and are preferably seated in respective notches provided in the upper surface of the arched frame members 17 and 18.

A suitable covering which may be formed of light weight metal or fabric to define a protective roof 24 is fixed to the upper surfaces of the ribs 23 and arched frame members 17, 18. The end of the canopy 15 adjacent the transverse frame member 17 is likewise covered with a similar protective covering to define a protective closure 25, the lower edge of which may be scalloped as indicated at 26 or otherwise embellished for decorative purposes.

A pair of support arms, broadly indicated at 31 and 32, extend from beneath the canopy 15 for attachment to the roof of an automobile A as most clearly seen in Figure 2. The support arms 31, 32 may be formed integral with and extend in substantial axial alinement from the transverse frame members 17 and 18. Each of the support arms 31 and 32 is preferably of generally inverted U-shaped configuration and provided with straight end portions 33 and 34, the end portions 34 being connected to or formed integral with the transverse frame members 17, 18. The protective covering 24 on the canopy 15 extends over the end portions 33 and 34 and may extend over the remainder of the suport arms 31, 32 if desired.

Suitable means for releasably engaging the upper surface of the automobile roof A are attached or adjustably connected to the free end portions 33 of the support arms 31 and 32, which means may take the form of suction cups 35 such as indicated in Figures 1 and 2 or lodestones or magnets such as indicated at 36 in Figure 7. By providing an adjustable connection such as broadly indicated at 37 in Figure 7 between the suction cups 35 or lodestones 36 and their respective support arms 31, 32, the suction cups 35 or lodestones 36 may be movable relative to their respective support arms so as to be readily adaptable to the varying contours of roof tops on different models of automobiles.

The support arms 31 and 32 are additionally supported by respective adjustable legs broadly indicated at 41 and 42, corresponding ends of which are adapted to engage the rain gutter 43 conventionally provided about the automobile roof A. The other ends of the legs 41 and 42 are pivotally connected to their respective support arms 31 and 32 by depending ears 44 and pivot pins 45 which penetrate the ears 44 and upper end portions of their respective legs 41 and 42.

The adjustable legs 41 and 42 each include an internally threaded sleeve portion 46 penetrated at its upper end by the pivot pin 45, and an externally threaded portion 47 threadably engageable with the sleeve portion 46 whereby the legs 41 and 42 are vertically adjustable. A footing 51 is fixed to the lower end of each externally threaded portion 47, the footings 51 each including a substantially U-shaped extension 52 adapted to be positioned within the rain gutter 43. The U-shaped extensions 52 substantially conform to the curvature of the rain gutter 43 and are preferably of less thickness than the overal depth of the rain gutter so as to permit water which accumulates in that portion of the rain gutter 43 between the footings 51 to flow past the extensions 52 without overflowing the rain gutter beneath the canopy 15.

It is apparent from the foregoing description that upon the adjustable legs 41 and 42 being positioned within the rain gutter 43 above a car door and the free ends of the support arms 31 and 32 being held in engagement with the roof by suitable means such as the suction cups 35 or permanent magnets 36, the canopy 15 is supported over the door in cantilever fashion to provide shelter. The canopy 15 preferably extends beyond the transverse frame members 17 and 18 and is of an overall length approximately equal to that of the front window of an automobile so as to provide adequate shelter for that area and for a tray positioned thereunderneath.

In order to provide shelter for the occupants of the rear seat of an automobile the extensible member 16 may be pulled longitudinally from within the canopy 15 to overhang the rear window of the automobile. The extensible member 16 includes longitudinally grooved frame members 53 which define trackways 54 adapted to mate wtih opposed trackways 55 secured to the inner surfaces of the longitudinal frame members 21 and 22 within the canopy 15. The inner ends of the longitudinal frame members 53 on the extensible member 16 are connected by a transverse frame member 56 (Figure 5) and the outer ends of the longitudinal frame members 53 are connected by an arcuate transverse frame member 57, to the outer surface of which is fixed a suitable sheet of protective covering such as indicated at 61. A similar protective covering 60 is secured to the upper surface of the frame members 53 and 56. The arcuate frame member 57 is adapted to fit beneath the arcuate transverse frame member 18 in the canopy 15 to close that end of the canopy when it is not desired to extend the extensible member 16.

Suitable stop means are provided for preventing the extensible member 16 from being completely withdrawn from the canopy 15, which stop means may take the form of pins 62 extending upwardly from adjacent the inner ends of the longitudinal frame members 53 for engagement with the transverse frame member 18 of the canopy 15 upon the extensible member being withdrawn a predetermined distance. In order to assist in pulling the extensible member 16 from the canopy 15, a suitable handle or ring 63 is provided on the outer surface of the protective covering 61. Likewise, a similar handle or ring 64 is provided on the forward edge of the canopy 15 for ease in carrying the awning.

Figure 10:
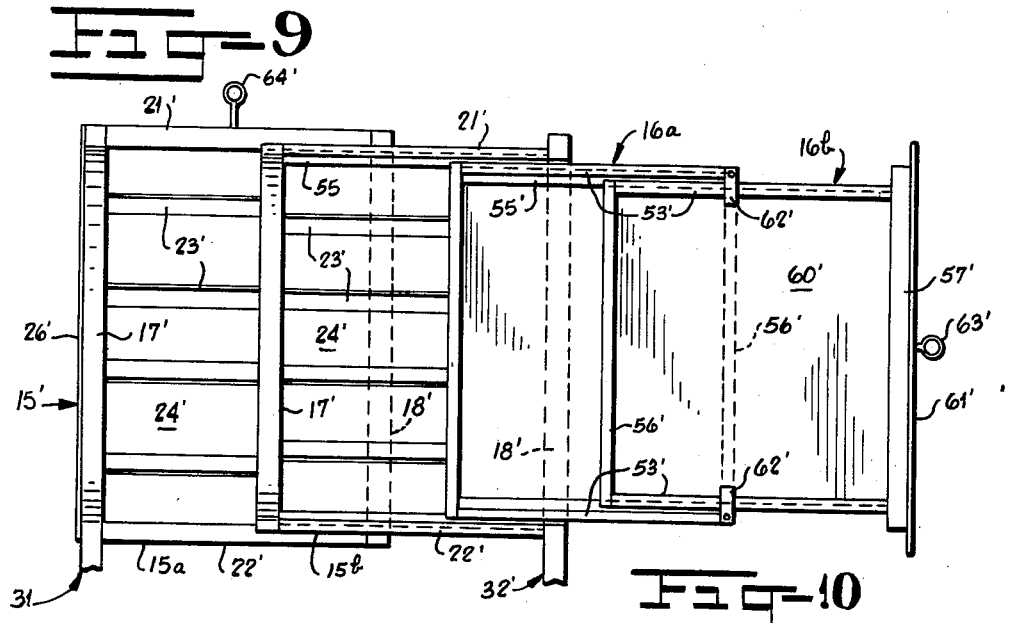
Figure 10 is an inverted plan view looking at the underside of the form of invention shown in Figure 6.
Figure 11:
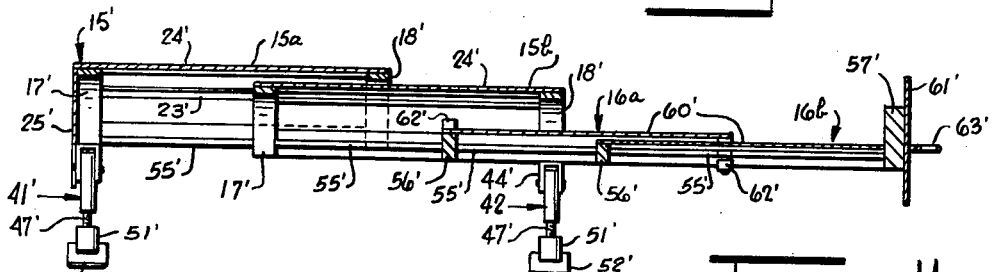
Figure 11 is a longitudinal vertical sectional view taken substantially along the line 11—11 in Figure 6.
Figure 12:
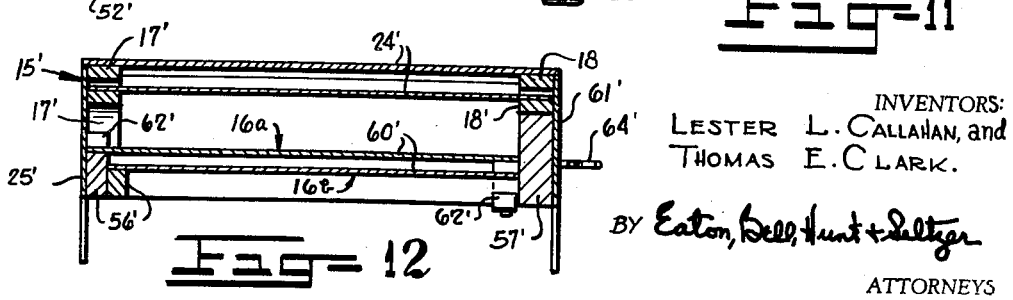
Figure 12 is a longitudinal vertical sectional view taken substantially along the line 12—12 in Figure 8.

Referring now to the form of invention shown in Figures 6 through 12, there will be observed a similar structure except that an extensible canopy and additional extensible members 16a and 16b have been provided in order to permit the collapsed awning to be reduced in size to provide a more compact unit when stored. In this form of invention the collapsed awning, as shown in Figure 8, is only aproximately one-half the length of the front window of an automobile, but the overall length of the awning, when extended, is the same as the overall length of the awning shown in Figures 1 through 5 when extended. The extensible canopy 15' includes a fixed section 15a and an extensible section 15b and is approximately the same overall length when extended as the canopy 15 in the form of invention first described.

The awning shown in Figures 6 through 12 is attached to the automobile in the same manner as previously described except that the support arm 32' is attached to the extensible canopy section or member 15b rather than to the fixed section or member 15a. It should be noted that in describing the form of invention shown in Figures 6 through 12 the identical reference numerals are applied to like parts as previously described with the prime notation added and only such parts as are necessary to an understanding of the modified form of invention will be additionally described.

It will be clear from an examination of Figures 6 through 12 that the member 15b is slidable within the canopy section 15a in the same manner as the extensible member 16 is slidable within the canopy 15 in Figures 1 through 5. Likewise, the extensible member 16a in Figures 6 through 12 is slidable within the member 15b and the extensible member 16b is slidable within the extensible member 16a in the same manner. To this end, each of the members 15a, 15b, 16a and 16b are provided with mating trackways 54' and 55' which are spanned by suitable transverse members adjacent opposite ends of each of said sections 15b, 16a and 16b.

The ends of sections 16a and the inner end of section 16b are spanned by transverse members 56' while the ends of section 15b are spanned by transverse members 17' and 18' and the outer end of section 16b is spanned by transverse member 57' adapted to fit within the member 18' on the outer end of section 15b when the awning is in the closed position of Figure 8. Suitable stops 62' are provided on each of the extensible members 15b, 16a and 16b to prevent them from being pulled beyond their respective housing members. It will likewise be noted that the extensible canopy section 15b is provided with an arched roof substantially identical with the arched roof of the canopy section 15a except of sufficiently smaller dimensions to be slidable within the section 15a.

It is of course clear that only the extensible canopy member 15b need be withdrawn while leaving the extensible members 16a and 16b telescoped therein if it is desired to shelter only one window of an automobile. Likewise, in the first form of invention, the extensible member 16 may be retained within the canopy 15 if desired.

It is thus seen that there is provided an improved awning and supporting means therefor for protecting the occupants of automobiles, which awning and its supporting means are of lightweight construction and susceptible of easy installation and removal from an automobile.

In the drawings and specification there have been set forth preferred embodiments of the invention and, although specific terms are employed, they are used in a generic and descriptive sense only and not for purposes of limitation, the scope of the invention being defined in the claims.

We claim:

1. In combination with an automobile having a roof, a side window and a rain gutter above the side window, an awning comprising a canopy and support means therefor, said support means including supporting arms extending from the canopy and overlying the roof, means adjacent the ends of said supporting arms remote from the canopy for releasably attaching said supporting arms to the roof, and legs depending from said supporting arms adjacent their juncture with the canopy, said legs being seated in said rain gutter whereby the canopy is supported in cantilever fashion over the side window.

2. In combination with an automobile having a roof, a side window and a rain gutter extending about that portion of the periphery of the roof above said side window, an awning comprising a canopy and at least one extensible member selectively movable into and out of said canopy, a pair of support arms extending from said canopy and overlying the roof, means adjacent the free ends of the support arms remote from the canopy for releasably connecting the support arms to the roof, and intermediate support means depending from the support arms adjacent their juncture with the canopy and extending between the support arms and said rain gutter, whereby the awning is supported in cantilever fashion over the side window.

3. An awning for attachment to the roof of an automobile having a side window and a rain gutter above the side window, said awning comprising a canopy and support means, said support means comprising supporting arms extending from the canopy and overlying the roof, means adjacent the ends of said supporting arms remote from the canopy for releasably attaching said supporting arms to the roof, and vertically adjustable legs depending from said supporting arms adjacent their juncture with the canopy for seating engagement in said rain gutter whereby the canopy is supported in cantilever fashion over the side window.

4. A structure according to claim 3 wherein said supporting arms are of generally inverted U-shaped configuration and provided with straight end portions adjacent their junctures with the canopy.

5. A structure according to claim 3 wherein the vertically adjustable legs are pivotally connected to their respective supporting arms.

6. A structure according to claim 3 wherein the means for releasably attaching the supporting arms to the roof are adjustably connected to their respective supporting arms to permit relative movement between said means and said supporting arms.

7. A structure according to claim 3 wherein substantially U-shaped footings are secured to the lower ends of said vertically adjustable legs for engagement with said rain gutter.

8. An awning for attachment to the roof of an automobile comprising a canopy, an extensible member, means slidably connecting said extensible member within said canopy for longitudinal movement with respect thereto, stop means for limiting outward movement of the extensible member relative to the canopy, and means extending transversely from the canopy for supporting the awning in cantilever fashion from the roof of an automobile.

9. A structure according to claim 8 wherein the canopy is arched transversely thereof and closed at one end, and a vertical end piece is provided on the outer end of the extensible member for closing the other end of the canopy when the extensible member is telescoped within the canopy.

10. A structure according to claim 8 wherein said canopy comprises extensible members, and means slidably connecting the extensible members forming said canopy for relative longitudinal movement therebetween.

11. An awning for the side window of a vehicle comprising a canopy, supporting arms attached to the side of said canopy adjacent to the window at opposite ends thereof and extending away therefrom, means on the ends of said supporting arms remote from said canopy for releasably attaching said awning to the roof of the vehicle, legs depending from said supporting arms adjacent their juncture with said canopy, and substantially U-shaped footings on the lower ends of said legs for seating engagement in the rain gutter of the vehicle above the side window.

References Cited in the file of this patent

UNITED STATES PATENTS

| | | |
|---|---|---|
| 961,422 | Pinkley | June 14, 1910 |
| 2,446,093 | Lambert | July 27, 1948 |
| 2,565,545 | Card | Aug. 28, 1951 |
| 2,580,632 | Williams | Jan. 1, 1952 |
| 2,580,704 | Schlagel | Jan. 1, 1952 |
| 2,760,241 | Silverman | Aug. 28, 1956 |
| 2,778,676 | Francis | Jan. 22, 1957 |
| 2,832,639 | Lysen | Apr. 29, 1958 |